(12) United States Patent
Wang (10) Patent No.: US 7,457,289 B2
(45) Date of Patent: Nov. 25, 2008

(54) INTER-PROXY COMMUNICATION PROTOCOL FOR MOBILE IP

(75) Inventor: Huizhao Wang, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 968 days.

(21) Appl. No.: 10/321,080

(22) Filed: Dec. 16, 2002

(65) Prior Publication Data

US 2004/0114559 A1 Jun. 17, 2004

(51) Int. Cl.
*H04L 12/56* (2006.01)
*H04Q 7/24* (2006.01)

(52) U.S. Cl. ........................ 370/392; 370/338
(58) Field of Classification Search ................ None
See application file for complete search history.

(56) References Cited

U.S. PATENT DOCUMENTS

| | | | |
|---|---|---|---|
| 4,692,918 A | 9/1987 | Elliott et al. | |
| 5,016,244 A | 5/1991 | Massey, Jr. et al. | |
| 5,018,133 A | 5/1991 | Tsukakoshi et al. | |
| 5,218,600 A | 6/1993 | Schenkyr et al. | |
| 5,276,680 A * | 1/1994 | Messenger | 370/311 |
| 5,371,852 A | 12/1994 | Attanasio et al. | |
| 5,473,599 A | 12/1995 | Li et al. | |
| 5,490,139 A | 2/1996 | Baker et al. | |
| 5,570,366 A | 10/1996 | Baker et al. | |
| 5,572,528 A | 11/1996 | Shuen | |
| 5,619,552 A | 4/1997 | Karppanen et al. | |
| 5,729,537 A | 3/1998 | Billstrom | |
| 5,751,799 A | 5/1998 | Mori | |
| 5,805,702 A | 9/1998 | Curry et al. | |
| 5,825,759 A | 10/1998 | Liu | |
| 5,862,345 A | 1/1999 | Okanoue et al. | |
| 5,978,672 A | 11/1999 | Hartmaier et al. | |
| 6,016,428 A | 1/2000 | Diachina et al. | |
| 6,055,236 A | 4/2000 | Nessett et al. | |
| 6,061,650 A | 5/2000 | Malkin et al. | |
| 6,075,783 A | 6/2000 | Voit | |
| 6,078,575 A | 6/2000 | Dommety et al. | |
| 6,079,020 A | 6/2000 | Liu | |
| 6,081,507 A | 6/2000 | Chao et al. | |

(Continued)

FOREIGN PATENT DOCUMENTS

EP 0924913 A1 6/1999

(Continued)

OTHER PUBLICATIONS

*International Search Report PCT/US 03/38568*, 4 pp., mailed May 21, 2004.

(Continued)

*Primary Examiner*—Kwang B. Yao
*Assistant Examiner*—Warner Wong
(74) *Attorney, Agent, or Firm*—Weaver Austin Villeneuve & Sampson LLP (57) ABSTRACT

Methods and apparatus for ascertaining configuration information for a node are disclosed. A first access point sends an inter-proxy request message to one or more additional access points, the inter-proxy request message identifying the node and indicating that IP configuration information for the node is requested. The first access point then receives an inter-proxy reply message from a second one of the additional access points, the inter-proxy reply message including the IP configuration information, thereby enabling the first access point to send a registration request on behalf of the node using the IP configuration information. In this manner, the Access Points support mobility for a node that does not support Mobile IP.

38 Claims, 6 Drawing Sheets

U.S. PATENT DOCUMENTS

| | | | |
|---|---|---|---|
| 6,122,268 | A | 9/2000 | Okanoue et al. |
| 6,131,095 | A | 10/2000 | Low et al. |
| 6,137,791 | A | 10/2000 | Frid et al. |
| 6,144,671 | A | 11/2000 | Perinpanathan et al. |
| 6,154,839 | A | 11/2000 | Arrow et al. |
| 6,163,843 | A | 12/2000 | Inoue et al. |
| 6,167,513 | A | 12/2000 | Inoue et al. |
| 6,172,986 | B1 | 1/2001 | Watanuki et al. |
| 6,173,399 | B1 | 1/2001 | Gilbrech |
| 6,175,917 | B1 | 1/2001 | Arrow et al. |
| 6,195,705 | B1 | 2/2001 | Leung |
| 6,226,748 | B1 | 5/2001 | Bots et al. |
| 6,226,751 | B1 | 5/2001 | Arrow et al. |
| 6,230,012 | B1 | 5/2001 | Willkie et al. ............... 455/435 |
| 6,240,089 | B1* | 5/2001 | Okanoue et al. ............ 370/390 |
| 6,256,300 | B1 | 7/2001 | Ahmed et al. |
| 6,272,129 | B1 | 8/2001 | Dynarski et al. ............ 370/356 |
| 6,308,267 | B1 | 10/2001 | Gremmelmaier ............ 713/168 |
| 6,339,830 | B1 | 1/2002 | See et al. |
| 6,377,982 | B1 | 4/2002 | Rai et al. |
| 6,393,482 | B1 | 5/2002 | Rai et al. |
| 6,396,828 | B1 | 5/2002 | Liu ............ 370/352 |
| 6,400,722 | B1 | 6/2002 | Chuah et al. |
| 6,445,922 | B1 | 9/2002 | Hiller et al. |
| 6,452,920 | B1 | 9/2002 | Comstock |
| 6,466,964 | B1 | 10/2002 | Leung et al. |
| 6,473,413 | B1 | 10/2002 | Chiou et al. ............... 370/331 |
| 6,496,491 | B2 | 12/2002 | Chuah et al. |
| 6,496,855 | B1 | 12/2002 | Hunt et al. ................. 709/217 |
| 6,510,144 | B1 | 1/2003 | Dommety et al. |
| 6,515,974 | B1 | 2/2003 | Inoue et al. |
| 6,522,880 | B1 | 2/2003 | Verma et al. |
| 6,535,493 | B1 | 3/2003 | Lee et al. ..................... 370/329 |
| 6,571,289 | B1 | 5/2003 | Montenegro |
| 6,577,643 | B1 | 6/2003 | Rai et al. ..................... 370/466 |
| 6,578,085 | B1 | 6/2003 | Khalil et al. ................ 709/241 |
| 6,587,882 | B1 | 7/2003 | Inoue et al. |
| 6,625,135 | B1 | 9/2003 | Johnson et al. ............. 370/332 |
| 6,651,105 | B1 | 11/2003 | Bhagwat et al. ............ 709/239 |
| 6,657,981 | B1 | 12/2003 | Lee et al. |
| 6,665,537 | B1 | 12/2003 | Lioy ....................... 455/435.1 |
| 6,683,871 | B1 | 1/2004 | Lee et al. |
| 6,684,241 | B1 | 1/2004 | Sandick et al. |
| 6,701,437 | B1 | 3/2004 | Hoke et al. |
| 6,707,809 | B1 | 3/2004 | Warrier et al. |
| 6,742,036 | B1* | 5/2004 | Das et al. .................... 709/226 |
| 6,760,444 | B1 | 7/2004 | Leung ....................... 380/270 |
| 6,763,007 | B1* | 7/2004 | La Porta et al. ............ 370/331 |
| 6,795,857 | B1 | 9/2004 | Leung et al. ................ 709/224 |
| 6,810,259 | B1 | 10/2004 | Zhang |
| 6,947,401 | B2 | 9/2005 | El-Malki et al. |
| 6,973,068 | B2* | 12/2005 | Inoue et al. ................. 370/338 |
| 6,982,967 | B1 | 1/2006 | Leung |
| 7,079,499 | B1 | 7/2006 | Akhtar et al. |
| 7,080,151 | B1* | 7/2006 | Borella et al. ............... 709/230 |
| 7,130,629 | B1 | 10/2006 | Leung et al. |
| 7,139,833 | B2* | 11/2006 | Heller ....................... 709/238 |
| 7,152,238 | B1 | 12/2006 | Leung et al. |
| 7,161,913 | B2* | 1/2007 | Jung ........................ 370/331 |
| 7,170,892 | B2 | 1/2007 | Major |
| 7,216,159 | B2 | 5/2007 | Hirose et al. |
| 7,260,638 | B2 | 8/2007 | Crosbie |
| 7,339,903 | B2* | 3/2008 | O'Neill ...................... 370/313 |
| 7,362,742 | B1 | 4/2008 | Siddiqi et al. |
| 2001/0005369 | A1 | 6/2001 | Kloth |
| 2001/0036184 | A1 | 11/2001 | Kinoshita et al. |
| 2002/0018456 | A1 | 2/2002 | Kakemizu et al. |
| 2002/0026527 | A1 | 2/2002 | Das et al. .................... 709/245 |
| 2002/0075807 | A1* | 6/2002 | Troxel et al. ............... 370/238 |
| 2002/0075866 | A1* | 6/2002 | Troxel et al. ............... 370/389 |
| 2002/0078238 | A1* | 6/2002 | Troxel et al. ............... 709/245 |
| 2002/0147837 | A1 | 10/2002 | Heller |
| 2003/0021275 | A1* | 1/2003 | Shabeer ..................... 370/393 |
| 2003/0123421 | A1 | 7/2003 | Feige et al. |
| 2003/0212794 | A1 | 11/2003 | Touati et al. |
| 2004/0001513 | A1 | 1/2004 | Major et al. |
| 2004/0024901 | A1 | 2/2004 | Agrawal et al. ............. 709/238 |
| 2004/0081086 | A1 | 4/2004 | Hippelainen et al. |
| 2004/0103282 | A1 | 5/2004 | Meier et al. |
| 2004/0109452 | A1 | 6/2004 | Takihiro et al. |
| 2004/0208187 | A1 | 10/2004 | Mizell et al. |
| 2004/0213172 | A1 | 10/2004 | Myers et al. |
| 2004/0213260 | A1 | 10/2004 | Leung |
| 2006/0203804 | A1 | 9/2006 | Whitmore et al. |

FOREIGN PATENT DOCUMENTS

| | | |
|---|---|---|
| EP | 0978977 A1 | 9/2000 |
| EP | 1124396 A2 | 8/2001 |

OTHER PUBLICATIONS

*International Search Report PCT/US2004/013365*, 7 pp., mailed Oct. 5, 2004.

C. Perkins, (Editor): "IP Mobility Support, RFC 2002," Oct. 1996, 55 pages.

Helmy et al., "Efficient Micro-Mobility using Intra-Domain Multicast-Based Mechanisms (M&M)", ACM SIGCOMM Computer Communications Review, vol. 32, No. 5: Nov. 2002, pp. 61-72, XP-002279254.

International Search Report PCT/US 03/38568 mailed May 21, 2004, 4 Pages.

U.S. Office Action, mailed Nov. 24, 2006, from U.S. Appl. No. 10/080,995.

US Office Action mailed Jun. 2, 2006, from (related) U.S. Appl. No. 10/080,995, 15 pp.

US Office Action mailed Jan. 25, 2007, from (related) U.S. Appl. No. 10/354,690, 26 pp.

US Office Action mailed Feb. 9, 2007, from (related) U.S. Appl. No. 10/080,995, 13 pp.

Network Working Group, RFC 2002 "IP Mobility Support," Oct. 1996, 80 pgs.

Charles Perkins, "Mobile IP Design Principles and Practices", Addison Wesley, 1998, pp. 50, 55-59, 83, 78.

U.S. Office Action dated Jul. 19, 2007 from related U.S. Appl. No. 10/080,995, 9 pgs.

U.S. Office Action mailed Jul. 3, 2007 from related U.S. Appl. No. 10/354,690, 18 pgs.

Mobile Networking Through Mobile IP, Perkins, IEEE 1998.

U.S. Office Action dated Apr. 17, 2007 from related U.S. Appl. No. 10/426,106, 9 pgs.

U.S. Office Action dated Jun. 15, 2007 from related U.S. Appl. No. 10/426,106, 13 pgs.

U.S. Office Action dated Jun. 4, 2007 from related U.S. Appl. No. 10/874,679, 14 pgs.

U.S. Office Action dated Nov. 8, 2007 from related U.S. Appl. No. 10/080,995, 9 pgs.

U.S. Office Action dated Nov. 28, 2007 from related U.S. Appl. No. 10/874,679, 16 pgs.

Notice of Allowance and Allowed Claims dated Nov. 29, 2007 from U.S. Appl. No. 10/354,690, 16 pgs.

U.S. Office Action dated Dec. 12, 2007 from related U.S. Appl. No. 10/426,106, 12 pgs.

Release notes for 3Com Corporation, "Conducting a Redundant Route for Network Resiliency", Mar. 1994, *NET Builder Family Bridge/Router* pp. 26-29.

J. Moy, RFC 1247 "OSPF Version 2", Jul. 19, 1991.

D. Oran, RFC 1142 "OSI IS-IS Intra-domain Routing Protocol", Feb. 1990.

Uyless Black, "TCP/IP and Related Protocols", 1992, *McGraw-Hill, Inc.*, pp. 226-249.

T. Li, et al., RFC 2281 "Cisco Hot Standby Router Protocol (HSRP)", Oct. 27, 1997.

Chambless, et al., "Home Agent Redundancy Protocol (HARP)", Oct. 27, 1997.

C. Perkins, Network Working Group, RFC 2002 "IP Mobility Support", Oct. 1996.

B. Adoba, et al., Network Working Group, RFC 2486 "The Network Access Identifier", Jan. 1999.

"Mobile IP", Release 12.0(1)T, pp. 1-55, Oct. 1996.

Montenegro, G., "Reverse Tunneling for Mobile IP", RFC 2344, Sun Microsystems, Inc., pp. 1-19, May 1998.

D. Harkins and D. Carrel, "The Internet Key Exchange (IKE)", Cisco Systems, pp. 1-33, Jun. 1998.

D. Cong and M. Hamlen and C. Perkins, "The Definitions of Managed Objects for IP Mobility Support using SMIv2", RFC 2006, Motorola and IBM, pp. 1-52, Oct. 1996.

C. Finseth, "An Access Control Protocol, Sometimes Called TACACS", RFC 1492, pp. 1-15, Sep. 13, 1992.

D. Carrel and Lol Grant, "The TACACS+ Protocol", Network Working Group, Internet-Draft, Cisco Systems, pp. 1-42, Jan. 1997.

C. Rigney, "RADIUS Accounting", RFC 2139, Livingston, pp. 1-25, Apr. 1997.

C. Rigney, et al., "Remote Authentication Dial in User Service (RADIUS)", RFC 2138, pp. 1-65, Apr. 1997.

Perkins & Hobby, Network Working Group, RFC 1172 "The Point-to-Point Protocol (PPP) Initial Configuration Options," Jul. 1990.

W. Simpson, Network Working Group, RFC 1994 PPP Challenge Handshake Authentication Protocol (CHAP), Aug. 1996.

R. Droms, "Dynamic Host Configuration Protocol", RFC 2131, Mar. 1997, pp. 1-39.

Lloyd, et al., Network Working Group, RFC, 1334 "PPP Authentication Protocols", Oct. 1992.

McGregor, Network Working Group, RFC 1332 "The PPP Internet Control Protocol (IPCP)", May 1992.

Simpson, ed., Network Working Group, RFC 1661, "The Point-to-Point Protocol (PPP)", Jul. 1994.

Calhoun and Perkins, "Mobile IP Network Access Identifier Extension for IPv4", Jan. 12, 2000.

Postel, J., "Simple Mail Transfer Protocol", STD 10, RFC 821, Aug. 1982.

Crocker, D. and P. Overrell, "Augmented BNF For Syntax Specifications: ABNF", RFC 2234, Nov. 1997.

Kent K. Leung, U.S. Appl. No. 09/227,399, "Mobile IP Authentication", filed Jan. 9, 1999.

* cited by examiner

FIG. 1

PRIOR ART

Client History Table

| Node IP address 604 | Node MAC address 606 | Gateway address (e.g., Home Agent) 608 | (Optional) Care-of address if different from Home Agent address 610 | Netmask 612 |
|---|---|---|---|---|
|  |  |  |  |  |
|  |  |  |  |  |
|  |  |  |  |  |
|  |  |  |  |  |

INTER-PROXY COMMUNICATION PROTOCOL FOR MOBILE IP

RELATED APPLICATIONS

This application is related to application Ser. No. 10/080,995, entitled "METHODS AND APPARATUS FOR SUPPORTING PROXY MOBILE IP REGISTRATION IN A WIRELESS LOCAL AREA NETWORK," by inventors Wang et al, filed on Feb. 20, 2002, from which priority is claimed, which is incorporated by reference for all purposes.

This application is also related to application Ser. No. 09/608,692, entitled "METHODS AND APPARATUS FOR IMPLEMENTING A PROXY MOBILE NODE IN A WIRELESS LOCAL AREA NETWORK," by inventor Kent K. Leung, filed on Jun. 29, 2000, from which priority is claimed, which is incorporated by reference for all purposes.

BACKGROUND OF THE INVENTION

1. Field of the Invention

The present invention relates to Mobile IP network technology. More particularly, the present invention relates to enabling mobility for a node that changes its location within a network through the use of control messages that are sent and received by access points.

2. Description of the Related Art

Mobile IP is a protocol which allows laptop computers or other mobile computer units (referred to as "Mobile Nodes" herein) to roam between various sub-networks at various locations—while maintaining internet and/or WAN connectivity. Without Mobile IP or related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one node and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 2002 of the Network Working Group, C. Perkins, Ed., October 1996. Mobile IP is also described in the text "Mobile IP Unplugged" by J. Solomon, Prentice Hall. Both of these references are incorporated herein by reference in their entireties and for all purposes.

Figure 1:
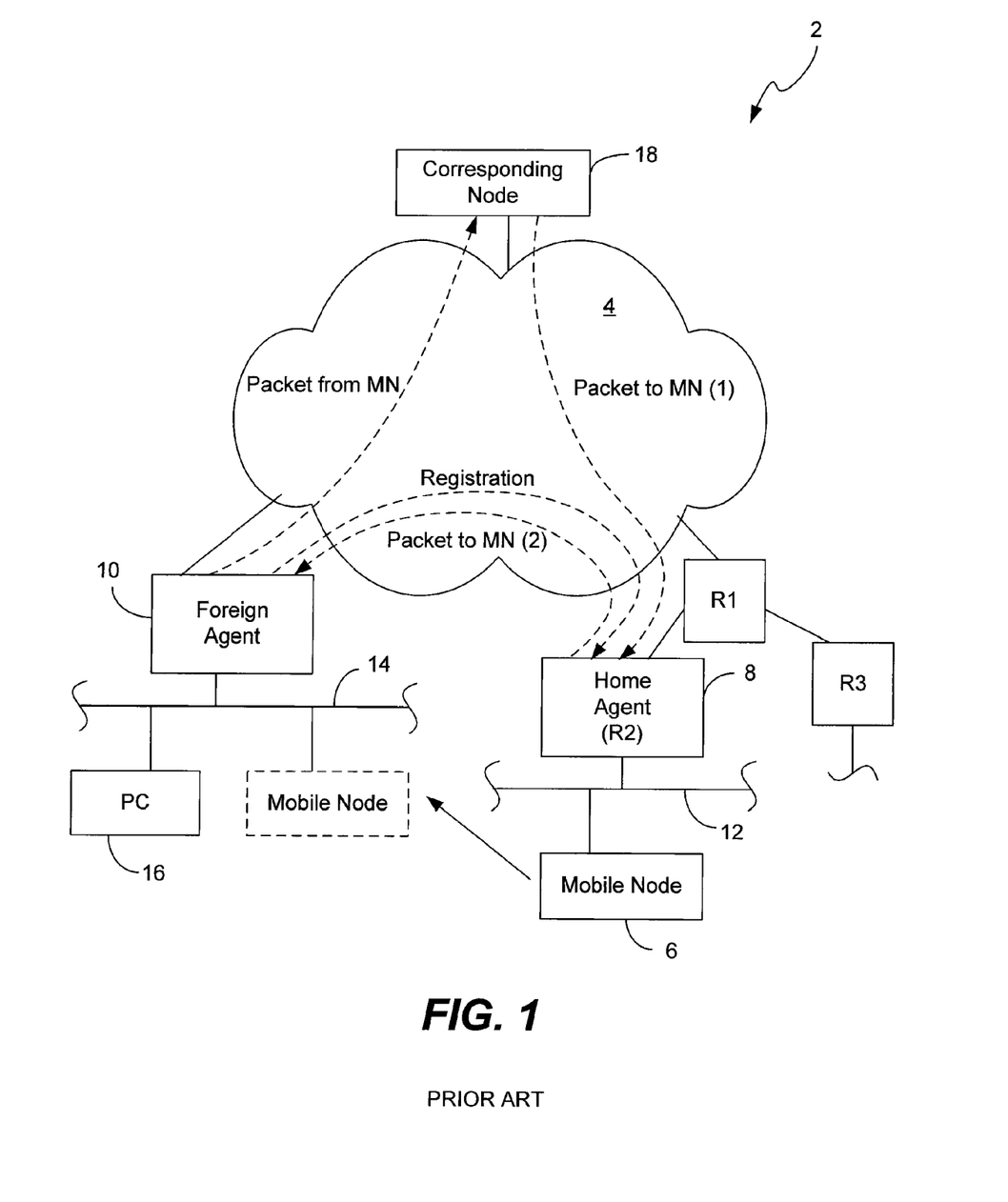
FIG. 1 is a diagram illustrating a Mobile IP network segment and associated environment.

The Mobile IP process and environment are illustrated in FIG. 1. As shown there, a Mobile IP environment 2 includes the internet (or a WAN) 4 over which a Mobile Node 6 can communicate remotely via mediation by a Home Agent 8 and a Foreign Agent 10. Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet through its designated Home Agent. When the Mobile Node roams, it communicates via the internet through an available Foreign Agent. Presumably, there are many Foreign Agents available at geographically disparate locations to allow wide spread internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the internet 4 through Home Agent 8 (an appropriately configured router denoted R2). Note that Home Agent 8 need not directly connect to the internet. For example, as shown in FIG. 1, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various solicitations and advertisements which form part of the Mobile IP protocol. When Mobile Node 6 engages with network segment 14, Foreign Agent 10 relays a registration request to Home Agent 8 (as indicated by the dotted line "Registration"). The Home and Foreign Agents may then negotiate the conditions of the Mobile Node's attachment to Foreign Agent 10. For example, the attachment may be limited to a period of time, such as two hours. When the negotiation is successfully completed, Home Agent 8 updates an internal "mobility binding table" which specifies the care-of address (e.g., a collocated care-of address or the Foreign Agent's IP address) in association with the identity of Mobile Node 6. Further, the Foreign Agent 10 updates an internal "visitor table" which specifies the Mobile Node address, Home Agent address, etc. In effect, the Mobile Node's home base IP address (associated with segment 12) has been shifted to the Foreign Agent's IP address (associated with segment 14).

Now, suppose that Mobile Node 6 wishes to send a message to a corresponding node 18 from its new location. An output message from the Mobile Node is then packetized and forwarded through Foreign Agent 10 over the internet 4 and to corresponding node 18 (as indicated by the dotted line "packet from MN") according to a standard internet protocol. If corresponding node 18 wishes to send a message to Mobile Node—whether in reply to a message from the Mobile Node or for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from corresponding node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling."

Since a node may not support Mobile IP, a node that changes its location within a network cannot initiate registration with its Home Agent. Proxy mobile IP support (i.e., proxy registration) may therefore be performed by an Access Point on behalf of the node. An Access Point (AP) is the center point in an all-wireless network or serves as a connection point between a wired and a wireless network. Multiple APs can be placed throughout a facility to give users with WLAN adapters the ability to roam freely throughout an extended area while maintaining uninterrupted access to all network resources. Once a node is registered with a Home Agent, packets may be forwarded by the Home Agent to the Foreign Agent. Moreover, the access point may also redirect packets sent by the node to the Foreign Agent, enabling the redirected packets to be sent to the appropriate destination by the Foreign Agent. application Ser. No. 10/080,995, entitled "METHODS AND APPARATUS FOR SUPPORTING PROXY MOBILE IP REGISTRATION IN A WIRELESS LOCAL AREA NETWORK," by inventors Wang et al, filed on Feb. 20, 2002, which discloses a method of supporting proxy registration by an Access Point, is incorporated by reference for all purposes.

In order to send a registration request on behalf of the node, the Access Point needs the node's IP address and Home Agent address (i.e., default gateway) in order to compose a registration request packet. In addition, the Access Point also ascertain's the node's sub-network network mask (i.e., netmask) in order to ascertain whether Mobile IP proxy services are required. Specifically, when the Access Point determines from the source address of a data packet and the netmask that the node is located on the subnet identical to the subnet of the Access Point, no Mobile IP service is required on behalf of the node as shown at block. However, when the Access Point determines from the source address that the node is not located on the subnet of the Access Point, proxy Mobile IP service is performed by the Access Point is performed on behalf of the node.

The node typically provides its configuration information such as IP address, default gateway (e.g., Home Agent), and network mask in an IP packet such as an IP data packet sent to the initial Access Point. As the node roams to another location, it roams to another Access Point. However, this subsequent Access Point within the network is not in possession of the node's configuration information. Moreover, the node is unaware that this subsequent Access Point does not have its configuration information.

In view of the above, it would therefore be desirable to enable the subsequent Access Point to obtain this configuration information without involvement, modification or configuration of the node.

SUMMARY OF THE INVENTION

The present invention enables configuration information for a node that does not support Mobile IP to be ascertained by an Access Point. Configuration information may include, for example, IP address of the node, and/or Home Agent address, network mask, as well as Foreign Agent address. The configuration information may be obtained by an Access Point from another Access Point having this configuration information. In this manner, an Access Point may obtain the configuration information for a node, thereby enabling the Access Point to initiate registration of the node with its Home Agent on behalf of the node.

In accordance with one aspect of the invention, a first access point sends an inter-proxy request message to one or more additional access points, the inter-proxy request message identifying the node and indicating that IP configuration information for the node is requested. The first access point then receives an inter-proxy reply message from a second one of the additional access points, the inter-proxy reply message including the IP configuration information, thereby enabling the first access point to send a registration request on behalf of the node using the IP configuration information. In this manner, the Access Points support mobility for a node that does not support Mobile IP.

In accordance with another aspect of the invention, the inter-proxy request message is sent to one or more additional access points by sending the request message to an inter-proxy multicast group. This is accomplished by configuring the Access Points to be associated with a particular multicast group. The inter-proxy request message may then be addressed to the inter-proxy multicast group IP address.

In accordance with yet another aspect of the invention, the inter-proxy request and reply messages conform to an inter-proxy protocol. The protocol may, for example, include a message type and opcode. In addition, a sequence number may also be included in both the request and reply messages, enabling request and reply messages to be matched with one another. Other information may be included in the request and reply messages. For instance, the request message identifies the node via an IP and/or MAC address. In addition, the request message also includes an IP address (and/or MAC address) of the sending Access Point, enabling the reply message to be sent to the correct Access Point. The reply message includes the requested configuration information, such as that set forth above.

Yet another aspect of the invention pertains to computer program products including machine-readable media on which are provided program instructions for implementing the methods and techniques described above, in whole or in part. Any of the methods of this invention may be represented, in whole or in part, as program instructions that can be provided on such machine-readable media. In addition, the invention pertains to various combinations and arrangements of data generated and/or used as described herein. For example, packets, and data structures having the format described herein and provided on appropriate media are part of this invention.

These and other features of the present invention will be described in more detail below in the detailed description of the invention and in conjunction with the following figures.

DETAILED DESCRIPTION OF THE INVENTION

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

The present invention enables Access Points to obtain IP configuration information for a node that does not support Mobile IP. This is accomplished by sending communication messages from one Access Point to the other Access Points with which it is associated in order to request IP configuration information for the node. Through the use of such communication, IP configuration information may communicated among Access Points, enabling registration and de-registration of the node with a Home Agent to be initiated by an Access Point.

An invention is described herein that enables a node (e.g., a node that does not implement the Mobile IP protocol) to roam to various Foreign Agents within a network such as a DHCP supported network. This is accomplished, in part, through the use of control messages sent between the access points within the network. For purposes of the following discussion, the term "mobile node" will be used to refer to a mobile node implementing the Mobile IP protocol while the term "node" will be used to refer to a node that does not implement the Mobile IP protocol.

Figure 2:
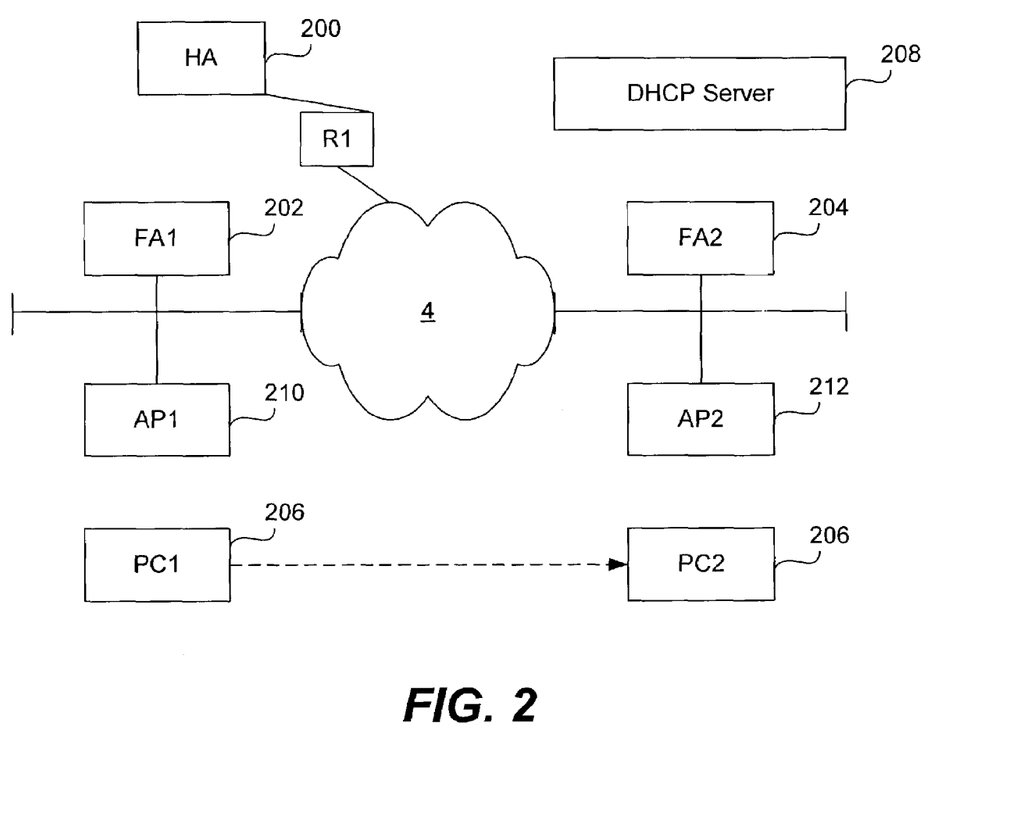
FIG. 2 is a diagram illustrating a system including multiple access points that may be used to implement the present invention.

FIG. 2 is a block diagram illustrating a system in which the present invention may be implemented. In the following description, the present invention is implemented in a wireless network. However, although the present invention is described as being implemented in a wireless network, the present invention may also be implemented in a non-wireless network. As shown, a node 206 may wish to roam from its Home Agent 200 to a first Foreign Agent 202. Similarly, once attached to the first Foreign Agent 202, the node 206 may again wish to roam to a second Foreign Agent 204. Although the node 206 may have an assigned IP address, when the node 206 roams, it is preferable for the node to maintain this assigned IP address. For instance, although a DHCP server 208 typically dynamically assigns a new IP address to a node when its location within a network has changed, it is preferable to maintain the IP address originally assigned to the node by the DHCP server 208.

In a wireless network, Access Points 210 and 212 are coupled to the Foreign Agents 202 and 204. By way of example, in a wireless network, the Access Points 210 and 212 may have an antenna and receiver for receiving packets. As yet another example, the Access Points 210 and 212 may designate connection points in a nonwireless network. Typically, a mobile node implementing Mobile IP registers and deregisters with its Home Agent through the registration process. However, according to the present invention, registration is initiated by the Access Point on behalf of the Mobile IP node. Similarly, de-registration may be initiated by the Access Point on behalf of the roaming node. For instance, node 206 that has roamed to the first Foreign Agent 202 is registered with the node's Home Agent 200 when the first Access Point 206 composes and sends a registration request packet via the first Foreign Agent 202. Thus, the first Foreign Agent's visitor table and the Home Agent's mobility binding table are updated to indicate that the node has roamed to the first Foreign Agent 202. When the node 206 roams to the second Foreign Agent 204, the node 206 is de-registered (e.g., by one of the Access Points 210, 212, either of the Foreign Agents 202, 204 or the Home Agent 200). In other words, the first Foreign Agent 202 updates its visitor table to reflect the movement of the node 206. Similarly, the Home Agent's mobility binding table is updated to reflect the movement of the node 206 to the second Foreign Agent 204. Thus, the appropriate entry in the first Foreign Agent's visitor table and the Home Agent's mobility binding table may be deleted. A new entry is then entered in the Home Agent's mobility binding table and the second Foreign Agent's visitor table upon completion of registration of the mobile node with the Home Agent. Alternatively, the visitor table may be maintained and updated by the Access Point.

Four exemplary methods of detecting a node's IP address are listed here. First, a node may be detected upon receipt of an Address Resolution Protocol (ARP) request and reply by the Access Point. More particularly, in order to send a packet to a destination IP address, a node must obtain the MAC address or "link-layer address" associated with the destination IP address. A node typically obtains a MAC address associated with an intended destination IP address by sending an ARP request to the Foreign Agent via the Access Point. Second, a node may attempt to send an actual IP data packet via the Foreign Agent. Thus, in this instance, if the node's IP address does not belong to the local subnet, the receipt of the data packet by the Access Point triggers the sending of a control packet (i.e., registration request packet) by the Access Point. Third, an access point may receive a DHCP reply designated to the node, and the Access Point can save the node's IP address obtained from the DHCP reply in its client table for future reference. Fourth, when a node roams to an access point and is associated with the access point, the access point can send an inter-proxy request message to a group of access points it is associated with. If one or more access points happen to have the node IP configuration saved in their client history table as mentioned in the above three methods, one or more inter-proxy reply messages will be sent back to the current access point.

In accordance with one embodiment of the invention, access point inter-proxy control messages are used by one or more Access Points to communicate information about the respective Access Points and/or nodes' IP configuration, so that the receiving access point can make an intelligent decision as to whether to registere the nodes with their Home Agent(s) via Foreign Agents on behalf of the nodes. More particularly, configuration information may be transmitted among the Access Points so that each Access Point may store a local copy of the configuration information associated with various nodes. Once obtained by an Access Point, this configuration information may then be used to initiate registration on behalf of a node.

Figure 3:
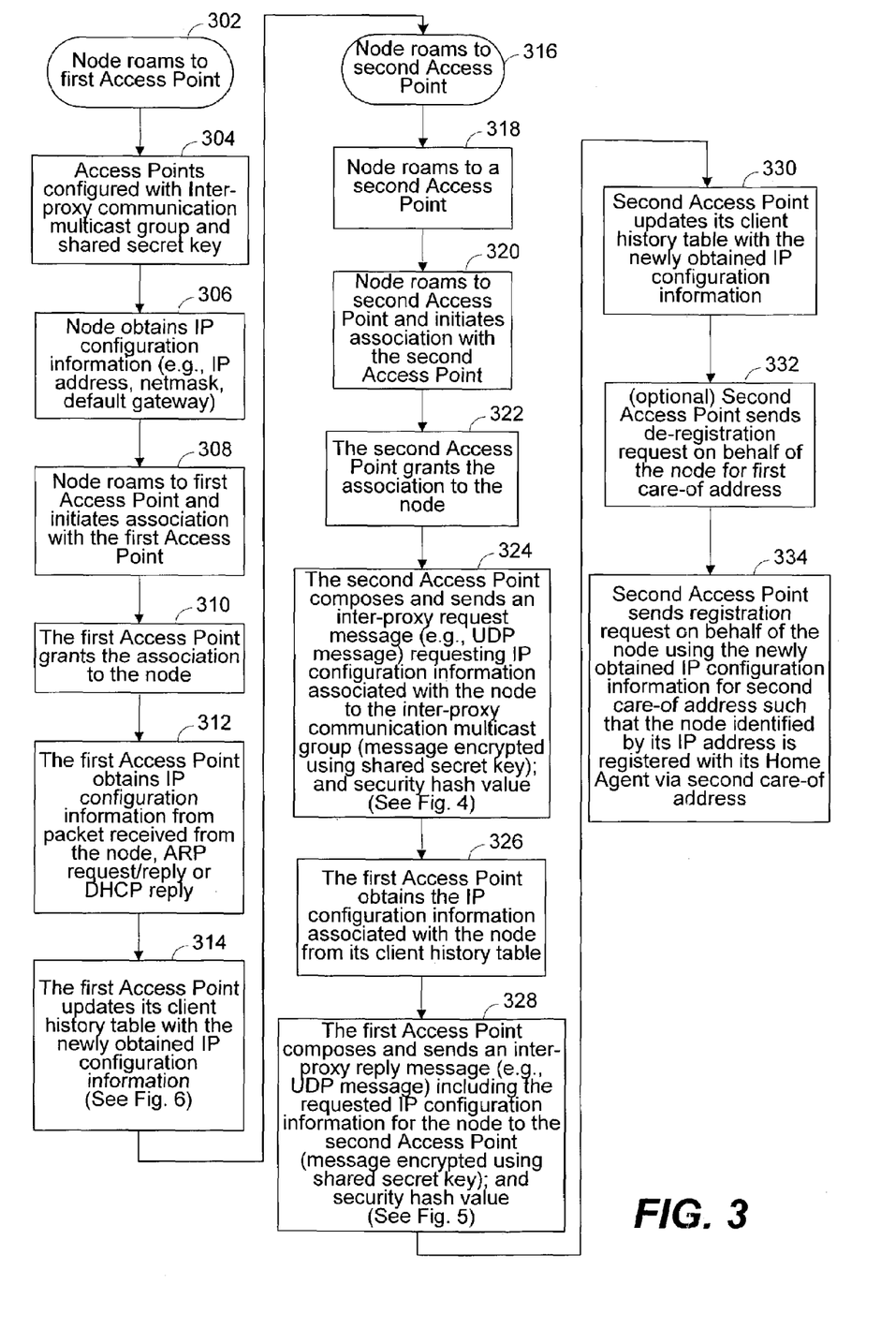
FIG. 3 is a process flow diagram illustrating a method of supporting proxy registration by an Access Point in accordance with various embodiments of the invention.

FIG. 3 is a process flow diagram illustrating a method of supporting proxy registration by an Access Point in accordance with various embodiments of the invention. As shown at blocks 302-314, the node first roams to a first Access Point. Specifically, each of the Access Points is configured to support inter-proxy communication at block 304. In accordance with one embodiment, each one of a plurality of Access Points is configured to be a member of an inter-proxy communication multicast group. For instance, all Access Points within a particular network may be configured with the same multicast group address. In addition, these Access Points are preferably configured with a shared secret key that is shared by the members of the multicast group. It is also important to note that inter-proxy communication may also be enabled in an alternate manner, such as direct communication among Access Points that are configured with and/or aware of the identity (e.g., IP address) of the other Access Points.

The node is also configured with its IP configuration information as shown at 306. This IP configuration information may include, but is not limited to, the node's IP address and default gateway (e.g., Home Agent), as well as the node's network mask. In addition, the Home Agent and Foreign Agent may be implemented in a single router. However, if the Home Agent and Foreign Agent are not implemented together, the IP configuration information may also include a Foreign Agent address.

When the node roams to a first Access Point, it initiates an 802.11 association with the first Access Point at block 308. When the first Access Point grants the 802.11 association to the node at 310, communication is established between the node and the first Access Point. The first Access Point then obtains the IP configuration information from a packet (e.g., IP data packet, DHCP reply packet, or ARP request/reply packet) received from the node at 312. Exemplary IP configuration information may include, for example, IP address, network mask, and/or default gateway (e.g., Home Agent). The first Access Point then updates its client history table with the newly obtained configuration information at block 314. An exemplary client history table will be described in further detail below with reference to FIG. 6.

The node then roams to a second Access Point as shown at 316-318, and initiates an 802.11 association with the second Access Point at 320. The second Access Point then grants the association with the node at 322. The node and the second Access Point may now communicate with each other.

In order to obtain configuration information for the node, the second Access Point sends an inter-proxy request message (e.g., UDP message) identifying the node with its Link Layer MAC address and requesting IP configuration information associated with the node to the inter-proxy communication multicast group at 324. For instance, the node may be identified by a MAC address and/or IP address. This inter-proxy request message my be protected using the shared secret key with security hashing (e.g., MD5) An example inter-proxy request message will be described in further detail below with reference to FIG. 4.

When the first Access Point receives the inter-proxy request message at 326, it obtains the IP configuration information associated with the node from its client history table. The first Access Point then composes and sends an inter-proxy reply message (e.g., UDP message) including the requested IP configuration information for the node to the second Access Point at 328. This inter-proxy reply message is preferably composed with an attached hash value in order to support an integrity check by the receiving Access Point, where the hash value is generated using the shared secret key and security hashing such as MD5. An exemplary inter-proxy reply message will be described in further detail below with reference to FIG. 5.

It is important to note that other Access Points other than the first Access Point will also be receiving the inter-proxy request message. Upon receipt of the inter-proxy request message, the receiving Access Points will search their client history table for IP configuration information for the node, and will send an inter-proxy reply message if and when IP configuration information for the node is located in its client history table, which stores IP configuration information for one or more nodes. IP configuration information preferably includes an IP address for the node, subnet mask and a Home Agent address.

When the second Access Point receives the inter-proxy reply message at 330, it updates its client history table with the newly obtained IP configuration information. The second Access Point may also send a de-registration request on behalf of the node for its first care-of address at 332, enabling the node to de-register with its Home Agent for the first registration request sent by the first Access Point. The second Access Point then sends a registration request on behalf of the node using the newly obtained IP configuration information at 334, if the second access point determines that the node's IP address does not belong to the local subnet.

Figure 4:
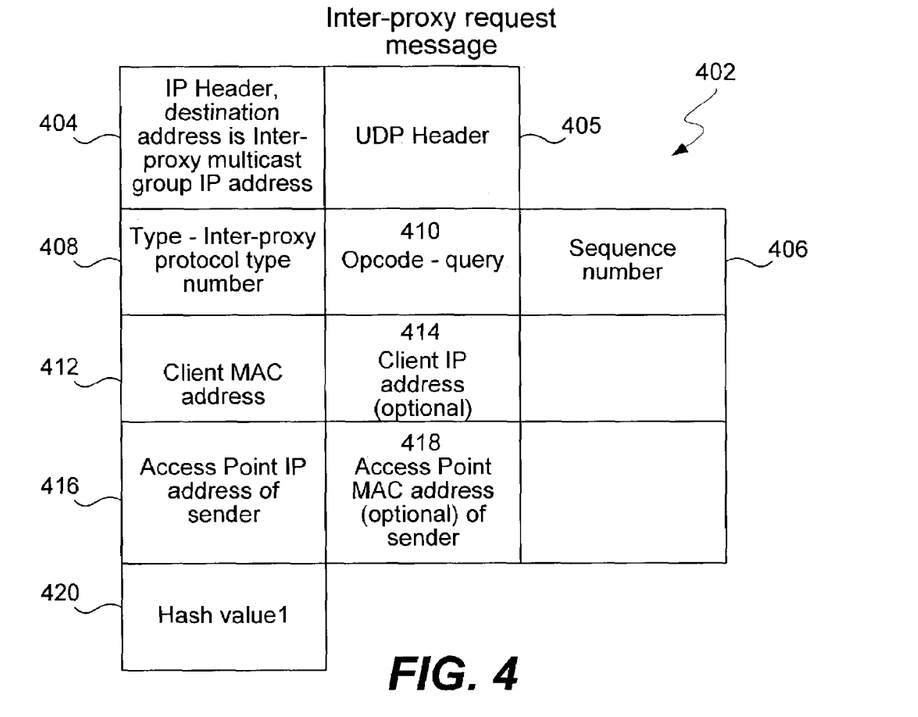
FIG. 4 is a diagram illustrating the format of an exemplary query message format sent by a subsequent Access Point in accordance with various embodiments of the invention.

As described above with reference to block 324 of FIG. 3, the inter-proxy request message identifies a node and indicates that IP configuration information for the node is requested. FIG. 4 is a diagram illustrating the format of an exemplary query message format 402 sent by a subsequent Access Point in accordance with various embodiments of the invention. As described above, the inter-proxy request message is an IP packet using the UDP transport protocol addressed to an inter-proxy multicast group address associated with a plurality of Access Points. Thus, the inter-proxy request message includes an IP header 404, where the destination IP address is the inter-proxy multicast group address. In addition, the inter-proxy request message includes a UDP header 405. The inter-proxy request message also includes a sequence number 406, which should match the sequence number in the inter-proxy reply message illustrated in FIG. 5. In accordance with the inter-proxy protocol illustrated, the inter-proxy request message includes a type 408 that identifies the inter-proxy request message as an inter-proxy protocol message. The inter-proxy request message also includes an opcode 410 identifying the inter-proxy request message as a query. As described above, the node may be identified by its MAC address and/or its IP address 414. The inter-proxy request message also includes an IP address of the "sending" Access Point 416, which is the first Access Point sending the inter-proxy request message. The inter-proxy request message may also include the MAC address 418 of the first Access Point sending the inter-proxy request message. As described above, the inter-proxy request message is preferably composed to include a hash value that supports an integrity check with a key that is shared by the first Access Point and the second Access Point (e.g., members of the inter-proxy multicast group). Thus, the inter-proxy request message will include a hash value 420 generated using the shared key.

Figure 5:
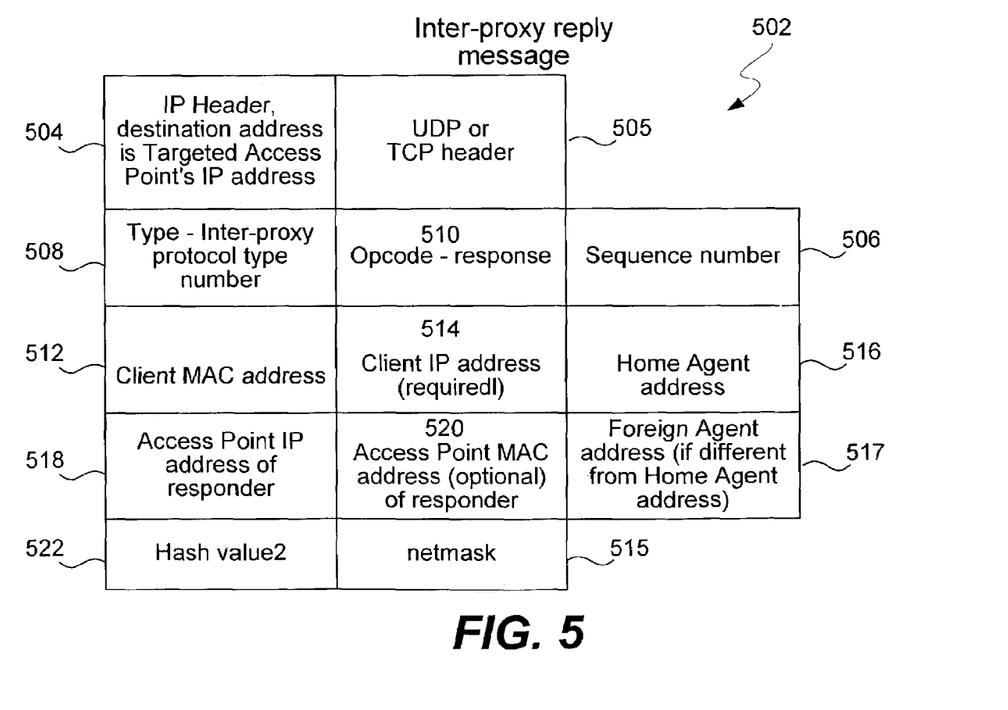
FIG. 5 is a diagram illustrating the format of an exemplary response message sent by a receiving Access Point responding to a query message in accordance with various embodiments of the invention.

FIG. 5 is a diagram illustrating the format of an exemplary response message 502 sent by a receiving Access Point responding to a query message in accordance with various embodiments of the invention. As described above, the inter-proxy reply message is an IP packet using either the UDP or TCP transport protocol addressed to the Access Point that sent the inter-proxy request message. Thus, the inter-proxy reply message includes an IP header 504, where the destination IP address is the targeted Access Point's IP address. In addition, the inter-proxy reply message includes a UDP or TCP header 505. The inter-proxy reply message also includes a sequence number 506, which should match the sequence number in the inter-proxy request message described above with reference to FIG. 4. In this manner, inter-proxy request and reply messages may be mapped to one another. In accordance with the inter-proxy protocol illustrated, the inter-proxy reply message includes a type 508 that identifies the inter-proxy reply message as an inter-proxy protocol message. The inter-proxy reply message also includes an opcode 410 identifying the inter-proxy reply message as a response. As described above, the node may be identified by its MAC address 512. In addition, the configuration information that is returned includes the node's IP address 514, netmask 515, as well as it's Home Agent (or gateway) address 516. The IP configuration information may also include the Foreign Agent address (e.g., if different from the Home Agent address) 517. The inter-proxy request message also includes an IP address of the "sending" Access Point 518, which is the second Access Point sending the inter-proxy reply message. The inter-proxy request message may also include the MAC address 520 of the second Access Point sending the inter-proxy reply message. As described above, the inter-proxy reply message is preferably composed to include a hash value to support integrity checking with a key that is shared by the first Access Point and the second Access Point (e.g., members of the inter-proxy multicast group). Thus, the inter-proxy reply message will include a hash value 522 generated using the shared key.

Figure 6:
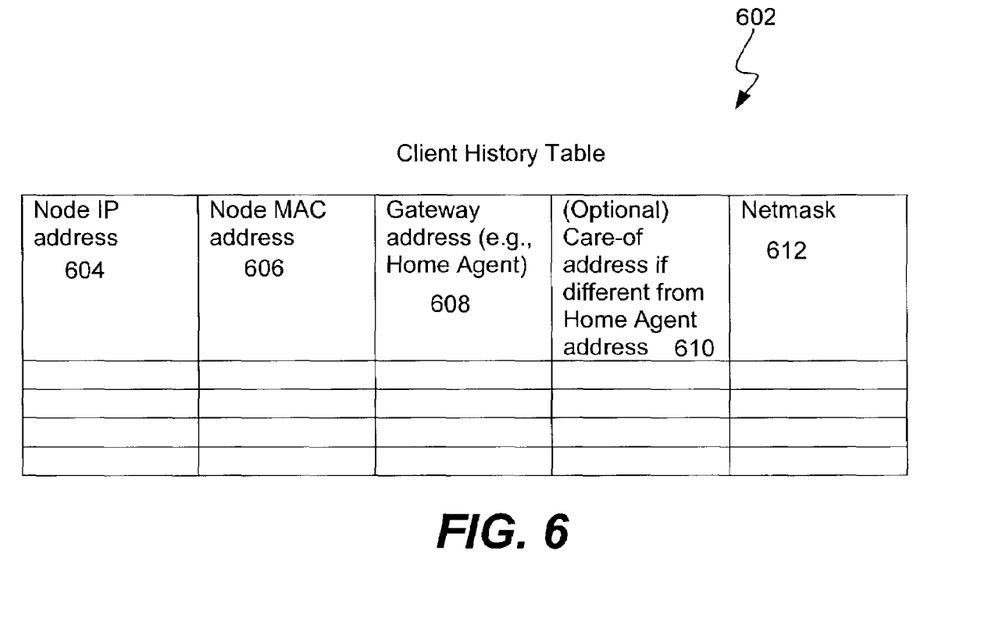
FIG. 6 is a diagram illustrating an exemplary client history table maintained by an Access Point for storing node configuration information for nodes that have previously registered with its Home Agent via the Access Point in accordance with various embodiments of the invention.

FIG. 6 is a diagram illustrating an exemplary client history table 602 maintained by an Access Point for storing node configuration information for nodes that have previously registered with its Home Agent via the Access Point in accordance with various embodiments of the invention. Various node configuration information may be stored for each node for which the Access Point has obtained this information, either directly (e.g., from the node) or indirectly (e.g., via inter-proxy protocol messages). For each node, an entry in the client history table is stored and associated with the node. In this example, each entry includes the node's IP address 604, and may also include the node's MAC address 606. The entry also includes the gateway address (e.g., Home Agent address) 608, and may also include a care-of address 610 identifying the Foreign Agent to which the node has roamed, if different from the Home Agent address. The IP configuration information may also include a netmask 612, which identifies the network mask that is used by the Access Point to ascertain the IP address and network of the node. In this manner, the Access Point may ascertain whether the node is within its home network or, alternatively, whether the Access Point must initiate registration on behalf of the node since the node has roamed outside its home network.

OTHER EMBODIMENTS

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the techniques of this invention may be implemented on a general-purpose programmable machine selectively activated or reconfigured by a computer program stored in memory. Such a programmable machine may be a network device designed to handle network traffic, such as, for example, a router or a switch. Such network devices may have multiple network interfaces including frame relay and ISDN interfaces, for example. Specific examples of such network devices include routers and switches. For example, the Access Points of this invention may be implemented in specially configured routers or servers, as well as Cisco Aironet 350, 1100 and 1200 Series Access Points, available from Cisco Systems, Inc. of San Jose, Calif. A general architecture for some of these machines will appear from the description given below. In an alternative embodiment, the techniques of this invention may be implemented on a general-purpose network host machine such as a personal computer or workstation. Further, the invention may be at least partially implemented on a card (e.g., an interface card) for a network device or a general-purpose computing device.

Figure 7:
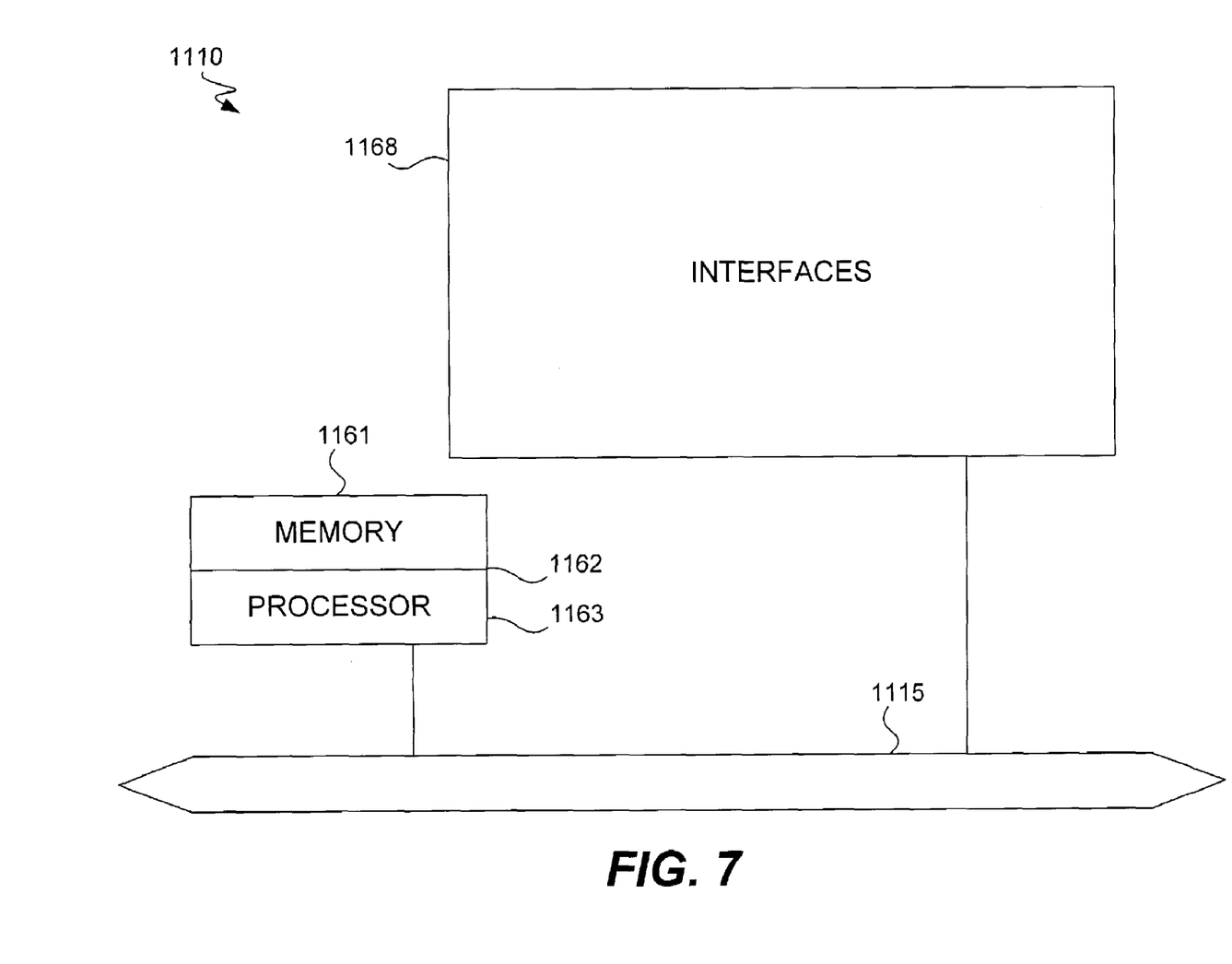
FIG. 7 is a block diagram of a network device that may be configured to implement aspects of the present invention.

Referring now to FIG. 7, a network device 1560 suitable for implementing the techniques of the present invention includes a master central processing unit (CPU) 1562, interfaces 1568, and a bus 1567 (e.g., a PCI bus). When acting under the control of appropriate software or firmware, the CPU 1562 may be responsible for implementing specific functions associated with the functions of a desired network device. For example, when configured as an intermediate router, the CPU 1562 may be responsible for analyzing packets, encapsulating packets, and forwarding packets for transmission to a set-top box. The CPU 1562 preferably accomplishes all these functions under the control of software including an operating system (e.g. Windows NT), and any appropriate applications software.

CPU 1562 may include one or more processors 1563 such as a processor from the Motorola family of microprocessors or the MIPS family of microprocessors. In an alternative embodiment, processor 1563 is specially designed hardware for controlling the operations of network device 1560. In a specific embodiment, a memory 1561 (such as non-volatile RAM and/or ROM) also forms part of CPU 1562. However, there are many different ways in which memory could be coupled to the system. Memory block 1561 may be used for a variety of purposes such as, for example, caching and/or storing data, programming instructions, etc.

The interfaces 1568 are typically provided as interface cards (sometimes referred to as "line cards"). Generally, they control the sending and receiving of data packets over the network and sometimes support other peripherals used with the network device 1560. Among the interfaces that may be provided are wired and wireless Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1562 to efficiently perform routing computations, network diagnostics, security functions, etc.

Although not shown, various removable antennas may be used for further increase range and reliability of the access points. In addition, radio transmit power e.g., 1, 5, 20, 30, 50, and 100 mW) on the Cisco Aironet 350, 1100 and 1200 Series is configurable to meet coverage requirements and minimize interference. In addition, a Cisco Aironet AP can be configured as a redundant hot standby to another AP in the same coverage area. The hot-standby AP continually monitors the primary AP on the same channel, and assumes its role in the rare case of a failure of the primary AP.

Although the system shown in FIG. 7 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 1565) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. For instance, although the specification has described access points, other entities used to tunnel packets to mobile nodes on remote network segments can be used as well. For example, routers, bridges or other less intelligent packet switches may also employ the standby protocol of this invention. Moreover, although the present invention is useful for nodes that do not support Mobile IP, the invention may also be applicable for nodes that support Mobile IP. Moreover, the present invention may be applicable in a network supported by various protocols such as DHCP. Accordingly, the present embodiments are to be considered as illustrative and not restrictive, and the invention is not to be limited to the details given herein, but may be modified within the scope and equivalents of the appended claims.

What is claimed is:

1. In a first access point, a method of supporting mobility for a node that does not support Mobile IP, comprising:
    sending an inter-proxy request message to an IP address identifying an inter-proxy multicast group to which the first access point belongs, the inter-proxy request message identifying the node and indicating that IP configuration information for the node is requested, wherein a plurality of access points are members of the inter-proxy multicast group, thereby enabling the inter-proxy request message to be received by the plurality of access points; and
    receiving an inter-proxy reply message from a second access point in the plurality of access points in the inter-proxy multicast group, the inter-proxy reply message including the IP configuration information, thereby enabling the first access point to send a registration request on behalf of the node using the IP configuration information, wherein the IP address does not uniquely identify the second access point, wherein the registration request is a Mobile IP registration request, wherein the second access point is not a Home Agent of the node.

2. The method as recited in claim 1, further comprising:
    composing a registration request on behalf of the node using the IP configuration information; and
    sending the registration request.

3. The method as recited in claim 1, wherein each of the plurality of Access Points is not in a home network of the node.

4. The method as recited in claim 1, wherein each of the plurality of Access Points is in a foreign network.

5. The method as recited in claim 1, wherein the sending and receiving steps are performed in a wireless network.

6. The method as recited in claim 1, further comprising:
    composing and sending the Mobile IP registration request on behalf of the node using the IP configuration information.

7. The method as recited in claim 1, wherein the IP configuration information comprises a Home Agent address identifying a Home Agent.

8. The method as recited in claim 7, further comprising:
    composing and sending the Mobile IP registration request on behalf of the node using the IP configuration information.

9. The method as recited in claim 1, wherein each of the plurality of access points is configured to support proxy registration on behalf of nodes that do not support Mobile IP.

10. In a second access point, a method of supporting mobility for a node that does not support Mobile IP, comprising:
    receiving an inter-proxy request message from a first access point in an inter-proxy multicast group, the inter-proxy request message being addressed to an inter-proxy multicast group address associated with the inter-proxy multicast group to which the second access point belongs and indicating that IP configuration information for the node is requested, wherein a plurality of access points are members of the inter-proxy multicast group, thereby enabling the inter-proxy request message to be received by the plurality of access points;
    sending an inter-proxy reply message to the first access point, the inter-proxy reply message including the IP configuration information, thereby enabling the first access point to send a registration request on behalf of the node using the IP Configuration information, wherein the registration request is a Mobile IP registration request, wherein the second access point is not a Home Agent of the node;
    wherein the inter-proxy request message does not uniquely identify the second access point.

11. The method as recited in claim 10, further comprising:
    searching a client history table for IP configuration information for the node;
    wherein sending an inter-proxy reply message is performed when IP configuration information for the node is located in the client history table.

12. The method as recited in claim 11, wherein the IP configuration information comprises an IP address for the node and a Home Agent address.

13. The method as recited in claim 10, the method further comprising:
    obtaining the IP configuration information for the node from a client history table storing IP configuration information for a plurality of nodes.

14. The method as recited in claim 10, wherein the IP configuration information comprises an IP address for the node and a Home Agent address.

15. The method as recited in claim 10, wherein the sending and receiving steps are performed in a wireless network.

16. In a first access point, a method of supporting mobility for a node that does not support Mobile IP, comprising:

sending an inter-proxy request message to an inter-proxy multicast group address associated with an inter-proxy multicast group to which the first access point belongs, the inter-proxy multicast group including one or more additional access points, the inter-proxy request message identifying the node and indicating that IP configuration information for the node is requested, thereby enabling the one or more additional access points to receive the inter-proxy request message; and receiving an inter-proxy reply message from a second one of the additional access points in the inter-proxy multicast group, the inter-proxy reply message including the IP configuration information, thereby enabling the first access point to send a registration request on behalf of the node using the IP configuration information, wherein the registration request is a Mobile IP registration request, wherein the second access point is not a Home Agent of the node, wherein the inter-proxy multicast group address does not uniquely identify the second one of the additional access points.

17. The method as recited in claim 16, wherein the sending and receiving steps are performed in a wireless network.

18. A computer-readable medium storing thereon computer-readable instructions for supporting mobility for a node that does not support Mobile IP in a first access point, comprising:

instructions for sending an inter-proxy request message to an inter-proxy multicast group address associated with an inter-proxy multicast group to which the first access point belongs, the inter-proxy multicast group including one or more additional access points, the inter-proxy request message identifying the node and indicating that IP configuration information for the node is requested, thereby enabling the one or more additional access points to receive the inter-proxy request message; and instructions for receiving an inter-proxy reply message from a second one of the additional access points in the inter-proxy multicast group, the inter-proxy reply message including the IP configuration information, thereby enabling the first access point to send a registration request on behalf of the node using the IP configuration information, wherein the registration request is a Mobile IP registration request, wherein the second access point is not a Home Agent of the node, wherein the inter-proxy multicast group address does not uniquely identify the second one of the additional access points.

19. A first access point supporting mobility for a node that does not support Mobile IP, comprising:

means for sending an inter-proxy request message to an inter-proxy multicast group address associated with an inter-proxy multicast group to which the first access point belongs, the inter-proxy multicast group including one or more additional access points, the inter-proxy request message identifying the node and indicating that IP configuration information for the node is requested, thereby enabling the one or more additional access points to receive the inter-proxy request message; and means for receiving an inter-proxy reply message from a second one of the additional access points in the inter-proxy multicast group, the inter-proxy reply message including the IP configuration information, thereby enabling the first access point to send a registration request on behalf of the node using the IP configuration information, wherein the registration request is a Mobile IP registration request, wherein the second access point is not a Home Agent of the node, wherein the inter-proxy multicast group address does not uniquely identify the second one of the additional access points.

20. A first access point supporting mobility for a node that does not support Mobile IP, comprising:

a processor; and a memory, at least one of the processor and the memory being for:

sending an inter-proxy request message to an IP address identifying an inter-proxy multicast group to which the first access point belongs, the inter-proxy request message identifying the node and indicating that IP configuration information for the node is requested, wherein a plurality of access points are members of the inter-proxy multicast group, thereby enabling the inter-proxy request message to be received by the plurality of access points; and receiving an inter-proxy reply message from a second access point in the plurality of access points in the inter-proxy multicast group, the inter-proxy reply message including the IP configuration information, thereby enabling the first access point to send a registration request on behalf of the node using the IP configuration information, wherein the registration request is a Mobile IP registration request, wherein the second access point is not a Home Agent of the node, wherein the IP address does not uniquely identify the second access point.

21. The first Access Point as recited in claim 20, wherein the inter-proxy request message includes a MAC address identifying the node or an IP address identifying the node.

22. The first Access Point as recited in claim 20, wherein the inter-proxy request message includes a sequence number and the inter-proxy reply message includes the sequence number.

23. The first Access Point as recited in claim 20, wherein the inter-proxy request message includes a type that identifies the inter-proxy request message as an inter-proxy message and the inter-proxy reply message includes the type that identifies the inter-proxy reply message as an inter-proxy message.

24. The first Access Point as recited in claim 23, wherein the inter-proxy request message includes an opcode identifying the inter-proxy request message as a query, and the inter-proxy reply message includes an opcode identifying the inter-proxy reply message as a response.

25. The first Access Point as recited in claim 20, wherein the inter-proxy request message includes an IP address of the first access point and the inter-proxy reply message includes an IP address of the second access point.

26. The first Access Point as recited in claim 25, wherein the inter-proxy request message further includes a MAC address of the first access point and the inter-proxy reply message further includes a MAC address of the second access point.

27. The first Access Point as recited in claim 20, wherein the inter-proxy request message and the inter-proxy reply message are composed to include a hash value generated using a key shared by the first access point and the second access point.

28. The first Access Point as recited in claim 20, wherein the inter-proxy request message and the inter-proxy reply message are composed to include a hash value generated using a key shared by members of the inter-proxy multicast group.

29. The first Access Point as recited in claim 20, wherein the inter-proxy request message is an IP UDP message, and the inter-proxy reply message is either a UDP or TCP message.

30. The first Access Point as recited in claim 20, wherein the IP configuration information comprises an IP address of the node and a Home Agent address identifying the Home Agent of the node.

31. The first Access Point as recited in claim 30, wherein the IP configuration information further comprises a netmask.

32. The first Access Point as recited in claim 30, wherein the IP configuration information further comprises a care-of address.

33. The first Access Point as recited in claim 32, wherein the care-of address is the Home Agent address.

34. The first Access Point as recited in claim 20, wherein sending the inter-proxy request message is performed when the node roams to the first access point.

35. The first Access Point as recited in claim 20, at least one of the processor or the memory being further for:
   storing the IP configuration information in a client history table such that the IP configuration information is associated with the node.

36. A first access point supporting mobility for a node that does not support Mobile IP, comprising:
   a processor; and
   a memory, at least one of the processor and the memory being adapted for:
   sending an inter-proxy request message to an inter-proxy multicast group address associated with an inter-proxy multicast group to which the first access point belongs, the inter-proxy multicast group including one or more additional access points, the inter-proxy request message identifying the node and indicating that IP configuration information for the node is requested, thereby enabling the one or more additional access points to receive the inter-proxy request message; and
   receiving an inter-proxy reply message from a second one of the additional access points in the inter-proxy multicast group, the inter-proxy reply message including the IP configuration information, thereby enabling the first access point to send a registration request on behalf of the node using the IP configuration information, wherein the registration request is a Mobile IP registration request, wherein the second access point is not a Home Agent of the node, wherein the inter-proxy multicast group address does not uniquely identify the second one of the additional access points.

37. A computer-readable medium storing thereon computer-readable instructions for supporting mobility for a node that does not support Mobile IP in a first access point, comprising:
   instructions for sending an inter-proxy request message to an IP address identifying an inter-proxy multicast group to which the first access point belongs, the inter-proxy request message identifying the node and indicating that IP configuration information for the node is requested, wherein a plurality of access points are members of the inter-proxy multicast group, thereby enabling the inter-proxy request message to be received by the plurality of access points; and
   instructions for receiving an inter-proxy reply message from a second access point in the plurality of access points in the inter-proxy multicast group, the inter-proxy reply message including the IP configuration information, thereby enabling the first access point to send a registration request on behalf of the node using the IP configuration information, wherein the registration request is a Mobile IP registration request, wherein the second access point is not a Home Agent of the node, wherein the IP address does not uniquely identify the second access point.

38. A first access point supporting mobility for a node that does not support Mobile IP, comprising:
   means for sending an inter-proxy request message to an IP address identifying an inter-proxy multicast group to which the first access point belongs, the inter-proxy request message identifying the node and indicating that IP configuration information for the node is requested, wherein a plurality of access points are members of the inter-proxy multicast group, thereby enabling the inter-proxy request message to be received by the plurality of access points; and
   means for receiving an inter-proxy reply message from a second access point in the plurality of access points in the inter-proxy multicast group, the inter-proxy reply message including the IP configuration information, thereby enabling the first access point to send a registration request on behalf of the node using the IP configuration information, wherein the registration request is a Mobile IP registration request wherein the second access point is not a Home Agent of the node, wherein the IP address does not uniquely identify the second access point.

* * * * *